Figure 1:
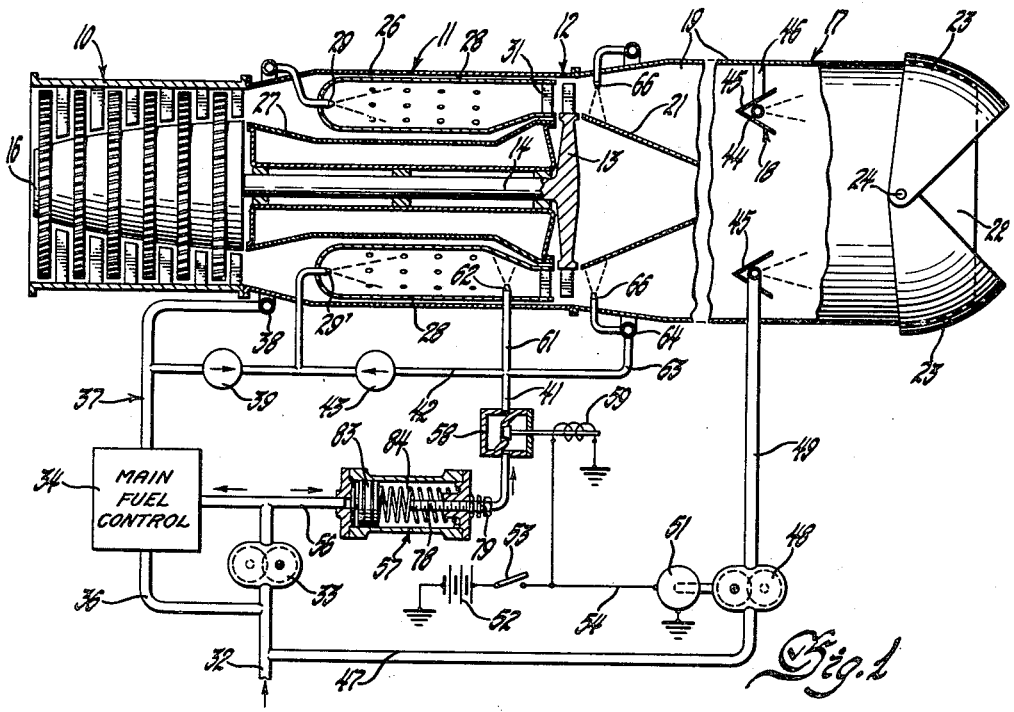

Aug. 27, 1957  C. J. McDOWALL ET AL  2,804,241

FLOW CONTROL METER

Filed Sept. 15, 1951

Inventors
Charles J. McDowall &
Arthur W. Goubatz
By Willits, Helmig & Baillio
Attorneys

United States Patent Office 2,804,241
Patented Aug. 27, 1957

2,804,241

FLOW CONTROL METER

Charles J. McDowall and Arthur W. Gaubatz, Indianapolis, Ind., assignors to General Motors Corporation, Detroit, Mich., a corporation of Delaware Application September 15, 1951, Serial No. 246,792

6 Claims. (Cl. 222—335)

Our invention relates to a fuel metering device adapted to deliver a predetermined quantity of fluid at each operation of the device. The device is intended for use in a "hot streak" ignition system for a turbojet afterburner, and is described herein as part of such a system, although it may be otherwise employed.

In order to augment the thrust of turbojet engines for takeoff or emergencies, such engines have been fitted with afterburners which burn fuel in the exhaust gases discharged from the turbine before the gases leave the propulsive jet nozzles of the engine.

The conventional method of afterburner ignition involves the use of an electric spark. This arrangement involves complicated electrical equipment and becomes progressively less reliable and satisfactory as the altitude of the aircraft increases. It has been proposed, therefore, to ignite the afterburner by spraying fuel into some part of the engine ahead of the afterburner at which the conditions of combustion, temperature, and gas velocity are such that the excess fuel will be ignited and provide a tongue of flame or "hot streak" extending to the afterburner to ignite the afterburner. On an experimental basis, this method of ignition has proved to be successful. It has involved danger to the engine, however, since the introduction of the fuel for the pilot flame increases the already high temperatures in the engine to a dangerous level.

This invention is directed to the elimination of this danger in the engine by limiting the amount of fuel which may be introduced, so that excessive temperatures cannot persist for a dangerous length of time. The limitation of the pilot fuel may be effected in various ways, as by limiting the rate of flow and the time during which the pilot fuel is supplied; however, the preferred embodiment involves a very simple and reliable system of control including a metering cylinder which allows only a predetermined quantity of fuel to flow to the pilot flame nozzles whenever the afterburner ignition system is activated.

The fuel metering device or apparatus as such is highly advantageous from the standpoints of simplicity, reliability, light weight, and compactness so that it not only is particularly well adapted for aircraft installations, but may also be highly beneficial in many other situations.

The principal object of the invention is to provide a novel and improved fluid metering or dispensing apparatus.

Other objects of the invention and the advantages thereof will be more clearly apparent to those skilled in the art from the succeeding description of the presently preferred embodiment of the invention.

Figure 2:
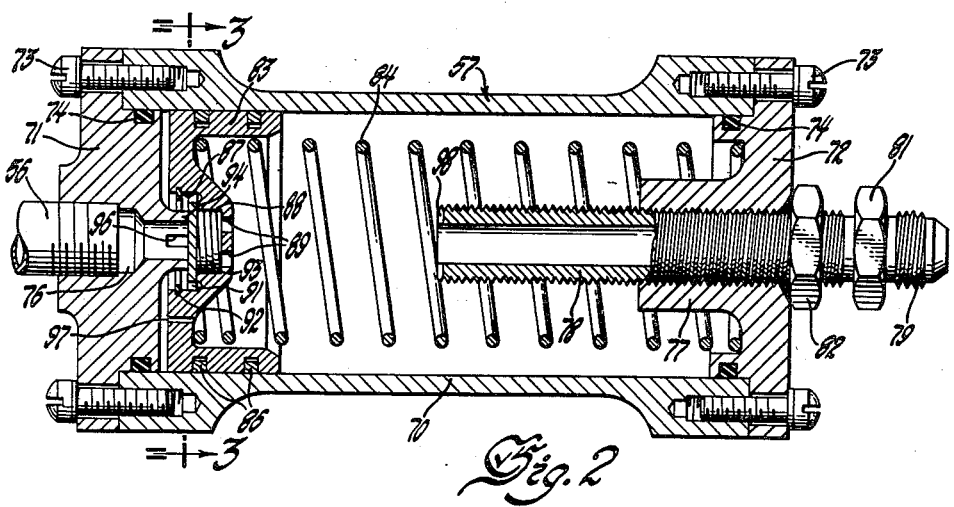
Figure 3:
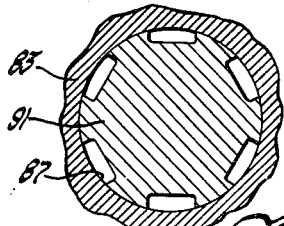

Referring to the drawings, Figure 1 is a schematic illustration of a gas turbine jet engine including an afterburner with the fuel and ignition system of the invention associated therewith; Figure 2 is a longitudinal sectional view of a fuel metering cylinder; and Figure 3 is a detail sectional view of the same taken on the plane indicated in Figure 2.

Referring first to Figure 1, it may be pointed out that the details of the jet engine as such are immaterial to the invention and that the invention may be incorporated in jet engines of various configurations. In order to explain the principle of the invention, Figure 1 illustrates in a schematic or diagrammatic manner a known type of gas turbine jet propulsion engine including an afterburner. Since such engines are generally understood, the illustrative engine will be described only briefly. It comprises a compressor 10 of the axial-flow type discharging into a combustion apparatus 11, the combustion products from which drive a turbine 12. The wheel 13 of the turbine is coupled by a shaft 14 to the rotor 16 of the compressor. The turbine discharges into an extended exhaust duct 17 in which is mounted an afterburner 18. The exhaust duct is defined by an outer duct wall 19, and, in the forward portion of the duct only, by an inner wall or tailcone 21 supported in any suitable manner from the outer duct 19. The exhaust duct 17 terminates in a jet propulsion nozzle 22, the area of which may be varied by flaps 23 movable about a pivot 24 by a suitable mechanism.

The combustion apparatus 11 may comprise an outer shroud or casing 26, an inner shroud 27, and combustion chambers or flame tubes 28 mounted between the shrouds 26 and 27. The combustion chambers 28 are perforated for admission of air and are fitted at the forward ends with fuel spray nozzles 29. In the operation of the engine, air drawn in and compressed by the compressor 10 flows between the shrouds 26 and 27 of the combustion apparatus into the combustion chambers 28 where it is heated by combustion of fuel injected by the nozzles 29. The combustion products flow from the combustion chambers through a turbine nozzle diaphragm 31 to drive the turbine wheel 13. The gases exhausted from the turbine are diffused and retarded in axial velocity in the diverging exhaust duct 17 and are discharged through the nozzle 22.

In normal operation, the afterburner is out of action and the members 23 are moved to reduce the area of the jet nozzle. When increased thrust is required, fuel is supplied to the afterburner 18, is ignited, and burns in the after part of the exhaust duct 17, increasing the energy of the jet. When the afterburner is in operation, the valves 23 are opened to provide the maximum area of the jet nozzle 22.

Fuel may be supplied to the main fuel nozzles 29 in any suitable manner. A conventional fuel system is illustrated by which fuel is taken from a supply line 32 and forced by a pump 33, which may be driven by the engine, through a main fuel control 34 which regulates the fuel supply to the nozzles 29. Excess fuel is bypassed from the control 34 through a line 36 to the inlet of the pump, and the remainder is delivered through a line 37 to the nozzles 29. In the usual installation, all the nozzles 29 are connected to a ring manifold 38.

If it is desired to supply excess fuel to one of the fuel nozzles 29 for hot streak ignition of the afterburner, this fuel nozzle is connected to the supply line 37 through a check valve 39, as in the case of the nozzle 29' illustrated in Figure 1. The excess fuel for hot streak ignition is supplied independently of the main fuel control 34 from a line 41, 42 through a second check valve 43. The check valves are provided to prevent fuel supplied to the nozzle 29' from either of the lines 37 or 42 from flowing through the other of these lines.

The afterburner may comprise a ring fuel manifold 44 provided with a large number of fuel spray nozzles or orifices associated with a flame holder or baffle 45 provided to create controlled turbulence in the gas stream. The manifold 44 and flame holder 45 may be supported in the exhaust duct 17 by struts 46. The manifold 44 is supplied with fuel from the line 32 and the branch line 47 by a pump 48 connected to the manifold by a conduit 49. This pump 48, which is used only intermittently, may be driven by any suitable motor. For purposes of illustration, the pump is indicated as being driven by an electric motor 51 energized from a battery 52 through a switch 53 and line 54. It will be understood that instead of an electric motor 51, any other power source which could be energized at will might be employed.

The supply line 42 for additional fuel for hot streak ignition is supplied from the outlet of the main fuel pump 33 independently of the main fuel control 34 through a line 56, a fuel metering device 57, and a normally closed valve 58. The valve 58 is opened concurrently with the supply of fuel to the after burner. This may be accomplished by a solenoid-opened valve, the solenoid 59 of which is energized by the switch 53 whenever the fuel pump motor 51 is energized.

Fuel for the hot streak ignition may be injected at any one or more of a plurality of points, depending upon the requirements of the installation. As already stated, additional fuel may be supplied through the main fuel nozzle 29'. In addition, fuel may be supplied from the line 41 through a branch line 61 to a fuel nozzle 62 located near the discharge end of the combustion chamber 28 in which the nozzle 29' is mounted. Fuel may also be supplied from line 41 through a branch line 63 to a ring manifold 64 supplying one or more fuel nozzles 66 immediately downstream from the turbine. In some cases, injection of fuel through any one of the nozzles 29', 62, or 66 may suffice to ignite the afterburner by providing a streak or tongue of flame extending through the duct 17 to the afterburner. If desired, fuel may be injected at any two of these points, or at all three, so that, for purposes of illustration, a fuel supply to nozzles at all three of these points is shown.

The fuel metering device 57 in its preferred form is a device which is charged with a predetermined quantity of fuel before the afterburner is put into operation. When the pump 48 is started to supply fuel to the afterburner, the valve 58 is opened and this measured charge of fuel is forced by the pressure generated by the pump 33 from the metering device 57 through the line 41 to the nozzles by which the pilot flame is established. The rate of discharge of the fuel is governed by the characteristics of the nozzles. When this charge is exhausted, the metering device no longer supplies fuel to the nozzles and cannot supply fuel until the valve 58 is closed, whereupon the metering device refills.

By this arrangement, the amount of fuel supplied can be regulated, or in other words, the time during which the hot streak is maintained can be regulated, so as to prevent damage to the engine. No attention on the part of the pilot of the aircraft, who may be unduly busy with other matters, is required to turn off the ignition fuel to prevent overheating the engine.

Normally, the afterburner is used only for a short period of time. When the pilot shuts down the afterburner, the valve 58 closes and the metering device 57 automatically recharges in preparation for the next afterburning cycle.

Referring to Figure 2, the preferred form of fuel metering device comprises a cylinder 70 to which are fixed an inlet end cylinder head 71 and an outlet end cylinder head 72 which may be attached by machine screws 73 and may be sealed by O-rings 74. The cylinder head 71 is formed with an inlet passage 76 threaded to receive the supply conduit 56. The outlet end head 72 is formed with a boss 77 which is internally threaded to receive an externally threaded outlet pipe 78. The outlet pipe is threaded at 79 to receive the outlet line and is formed with a hexagonal section 81 by which it may be screwed into and out of the cylinder 72 in order to adjust the axial position of the outlet pipe 78 and thus vary the output of the cylinder, as will be explained. The outlet pipe 78 is located in position by a jam nut 82, which also compresses packing around the pipe.

A piston 83 slides freely in the cylinder 70, being biased toward the inlet end by a return spring 84 compressed between the piston and the outlet head 72. Piston rings 86 are mounted in grooves in the outer wall of the piston.

A fluid passage through the piston 83 is defined by a valve recess 87, a spring chamber 88, and a number of holes 89 through the piston. Referring also to Figure 3, a valve disk 91 formed with a fluted or scalloped margin is mounted in the valve chamber 87 and is retained therein by snap ring 92. The valve disk 91 is normally urged against the snap ring 92 by a light valve spring 93 retained between the disk 91 and the inner end of the chamber 88.

When there is no fluid pressure in the cylinder, and when the pressures on both faces of the piston 83 are nearly equal, the spring 84 forces the piston 83 to the left, as illustrated in Figure 2. The valve disk 91 engages a flange 94 surrounding the inlet passage 76. The return spring 84 being stronger than the valve spring 93, spring 93 is compressed and the valve disk 91 seats against the face of the piston, closing the passage through the piston. Flange 94 is notched to provide a fluid inlet 96 so that the inlet is not closed by the valve disk 91.

A very small bleed hole 97 is drilled through the piston 83, and the inner end of the outlet pipe 78 is notched as indicated at 98 so that the outlet is not entirely closed when the piston 83 engages the end of the outlet pipe. This bleed arrangement lets off any air or vapor which may form in the cylinder. The force exerted by the return spring 84 is greater than that exerted by the valve spring 93. The force of spring 84 divided by the area of piston 83 is less than the force of spring 93 divided by the area of valve disk 91.

The operation of the metering cylinder is as follows: Assuming that the cylinder is installed in the system of Figure 1 and is full of fuel, the valve 58 is closed, and the pump 33 is in operation, the piston 83 will be in the position illustrated in Figure 2. If the valve 58 is opened, fuel from the pump will enter the cylinder and the pressure exerted against the left-hand face of the piston will move the piston to the right, forcing the fuel on the right-hand side of the piston through the outlet pipe until the piston engages the end of the outlet pipe. The amount of fuel thus displaced is determined by the area of the piston and the length of the stroke.

Before valve 58 opens, pump outlet pressure is exerted on both faces of piston 83. When valve 58 opens, the pressure on the left face of the piston equals pump outlet pressure less the slight flow losses in the line 56 and the cylinder inlet. The pressure on the right face of the piston is the sum of static pressure in the combustion apparatus, pressure drop in the spray nozzle, and pressure drop in the line from the cylinder to the nozzle. There will be a small pressure differential across the piston sufficient to overcome the resistance of spring 84, the friction of the piston, and inertia of the moving parts during acceleration of the piston from rest. The rate of flow from the cylinder will be such that the outlet pressure plus the pressure differential across the piston equals the inlet pressure.

The rate of flow is determined primarily by the size of the nozzle or nozzles and the difference between pump discharge pressure and static pressure in the combustion apparatus. Any desired rate of flow may thus be established. The duration of the discharge may be set to any desired time by fixing the quantity discharged with relation to the rate of discharge.

Valve 91 is held closed by spring 84 when the cylinder is charged, as shown in Figure 2. When valve 58 opens, the pressure differential across the piston plus the impact of fluid entering the cylinder through the inlet 76 maintains the valve 91 closed.

The valve disk 91 remains seated when the piston reaches the end of the stroke since the pressure on the outlet side of the piston becomes very small. When this condition is reached, no fuel will flow except for a small amount of leakage around the piston and past the valve disk 91 and the small amount of fuel which flows through the bleed orifice 97. This small amount of fuel flows through the notches 98 in the outlet pipe and to the nozzles. This very small flow is insufficient to affect the operation of the engine to any measurable extent.

The piston remains seated against the outlet pipe until the valve 58 is closed. When this valve is closed, flow through the bleed 97 quickly increases the pressure in the outlet end of the cylinder, and the pressure differential between the two ends of the cylinder diminishes to a point at which the valve disk 91 is unseated by the spring 93. The return spring 84 then returns the piston to the inlet end of the cylinder. The opening of the valve 91 provides a relatively large passage for flow past the piston, so that it will return quickly to prepare the system for the next afterburner start. Valve 91 is opened by spring 93 and remains open notwithstanding the suction developed by spring 84 acting on the piston, which tends to close the valve. The valve remains open because the force per unit area on disk 91 due to spring 93 is greater than the force per unit area on the piston due to spring 84. When the valve disk 91 engages the boss 94, the entire force of the return spring acts against the valve spring 93 and seats the valve disk.

As will be apparent, the travel of the piston and thereby the quantity delivered by the fuel metering device may be varied by adjusting the axial position of the outlet tube 78 which acts as a stop to limit the travel of the piston. It will also be apparent that this adjustment feature could be eliminated if not required.

It will be noted that in operation the valves 58 and 91 couple the outlet end of the cylinder alternately to the discharge line 41 and to the inlet end of the cylinder. Other valve arrangements so operating could be used if desired.

The fuel metering device merely illustrates a preferred embodiment of the principle of the invention, and as will be apparent to those skilled in matters relating to hydraulic equipment, the principle might be embodied in various forms other than that shown.

The description herein of the preferred embodiment of the invention for the purpose of explaining the principles thereof is not to be construed as limiting the invention, since many modifications thereof within the principles of the invention will occur to those skilled in the art.

We claim:

1. A device for delivering a predetermined quantity of fluid at each operation of the device comprising, in combination, a cylinder, a piston freely reciprocable in the cylinder, means defining a fluid inlet at one end of the cylinder, means defining a fluid outlet at the other end of the cylinder, a return spring biasing the piston toward the inlet end of the cylinder, means defining a passage between the inlet and outlet ends of the cylinder, a valve in the passage adapted to close the passage against flow from the inlet to the outlet ends of the cylinder in response to a pressure differential, means biasing the valve toward an open position, and a second valve in the outlet of the cylinder.

2. A device for delivering a predetermined quantity of fluid at each operation of the device comprising, in combination, a cylinder, a piston freely reciprocable in the cylinder, means defining a fluid inlet at one end of the cylinder, means defining a fluid outlet at the other end of the cylinder, a return spring biasing the piston toward the inlet end of the cylinder, means defining a passage through the piston between the inlet and outlet ends of the cylinder, a valve in the passage adapted to close the passage against flow from the inlet to the outlet ends of the cylinder in response to a pressure differential, means biasing the valve toward an open position, and a second valve in the outlet of the cylinder.

3. A device for delivering a predetermined quantity of fluid at each operation of the device comprising, in combination, a cylinder, a piston freely reciprocable in the cylinder, means defining a fluid inlet at one end of the cylinder, means defining a fluid outlet at the other end of the cylinder, a return spring biasing the piston toward the inlet end of the cylinder, means defining a passage through the piston between the inlet and outlet ends of the cylinder, a valve in the passage adapted to close the passage against flow from the inlet to the outlet ends of the cylinder in response to a pressure differential, means biasing the valve toward an open position, a variable abutment for adjusting the stroke of the piston, and a second valve in the outlet of the cylinder.

4. A device for delivering a predetermined quantity of fluid at each operation of the device comprising, in combination, a cylinder, a piston freely reciprocable in the cylinder, means defining a fluid inlet at one end of the cylinder, means defining a fluid outlet at the other end of the cylinder, a return spring biasing the piston toward the inlet end of the cylinder, means defining a passage through the piston between the inlet and outlet ends of the cylinder, a valve in the passage adapted to close the passage against flow from the inlet to the outlet ends of the cylinder in response to a pressure differential, means biasing the valve toward an open position, and a second valve in the outlet of the cylinder, the means defining the fluid outlet comprising a conduit adjustable longitudinally of the cylinder in the way of the piston so that it provides a variable abutment for adjusting the stroke of the piston.

5. A device as recited in claim 2 in combination with means providing a restricted bleed passage connecting the two ends of the cylinder.

6. A device as recited in claim 5 in which the bleed passage is defined by a hole through the piston.

References Cited in the file of this patent

UNITED STATES PATENTS

| | | |
|---|---|---|
| 1,716,482 | Bradbury | June 11, 1929 |
| 2,005,832 | Vidalie | June 25, 1935 |
| 2,279,546 | Ziegler | Apr. 14, 1942 |
| 2,520,434 | Robson | Aug. 29, 1950 |
| 2,520,967 | Schmitt | Sept. 5, 1950 |
| 2,552,231 | Streid et al. | May 8, 1951 |
| 2,705,094 | Howell | Mar. 29, 1955 |

FOREIGN PATENTS

| | | |
|---|---|---|
| 421,130 | Great Britain | Dec. 14, 1934 |